United States Patent [19]
Bennett

[11] 3,808,817
[45] May 7, 1974

[54] PRESSURE BALANCED HYDRAULIC BRAKE BOOSTER

[75] Inventor: Ronald W. Bennett, Miamisburg, Ohio

[73] Assignee: General Motors Corporation, Detroit, Mich.

[22] Filed: Jan. 16, 1973

[21] Appl. No.: 324,207

[52] U.S. Cl. ................. 60/548, 60/550, 91/391 R, 91/434
[51] Int. Cl. ................... F15b 7/00, F15b 13/10
[58] Field of Search ............ 60/548, 550, 551, 547; 91/47, 391 R, 391 A, 434; 251/127, 361; 137/329.01, 269, 454.5

[56] References Cited
UNITED STATES PATENTS

| | | | |
|---|---|---|---|
| 2,934,041 | 4/1960 | Ayers | 91/47 |
| 2,680,350 | 6/1954 | Sprague et al. | 60/548 |
| 929,657 | 8/1909 | Comfort et al. | 137/269 |
| 3,064,431 | 11/1962 | Schnell | 60/548 |
| 1,054,023 | 2/1913 | Niedecken | 137/269 |
| 1,972,151 | 9/1934 | Link | 137/269 |

Primary Examiner—Edgar W. Geoghegan
Assistant Examiner—A. M. Zupcic
Attorney, Agent, or Firm—D. D. McGraw

[57] ABSTRACT

A hydraulic brake booster is shown which can withstand hydraulic supply system back pressure without affecting its output or brake pedal reaction. The booster control valve is of the open center type and is installed in its own valve chamber. The pedal pivot reaction force is utilized to operate the control valve.

The booster reaction system includes the control valve and its valve seat. The amount of brake reaction force transmitted to the brake pedal for any particular brake apply force generated by the booster may be varied by changing the effective valve seat diameter. In addition, initial brake pedal effort, and therefore line support pressure, may be modified by providing a reaction spring. The booster is compatible with a reserve pump system as well as with other brake system control units.

3 Claims, 2 Drawing Figures

PRESSURE BALANCED HYDRAULIC BRAKE BOOSTER

The invention relates to a hydraulic brake booster, and more particularly to one which is pressure balanced and has an open center control valve operating in a separate chamber from the brake booster piston. The brake pedal is pivoted on the control valve rod and on the booster piston rod. Brake reaction force is generated by the pressure differential acting across the effective control valve diameter. This effective diameter may be changed to provide more or less reaction feel by removing the valve seat and substituting another valve seat with a different effective diameter. When it is desired to provide line pressure support so as to alter the booster output force in relation to the initial brake pedal effort, a reaction spring tending to open the control valve may be used.

IN THE DRAWING

Figure 1:
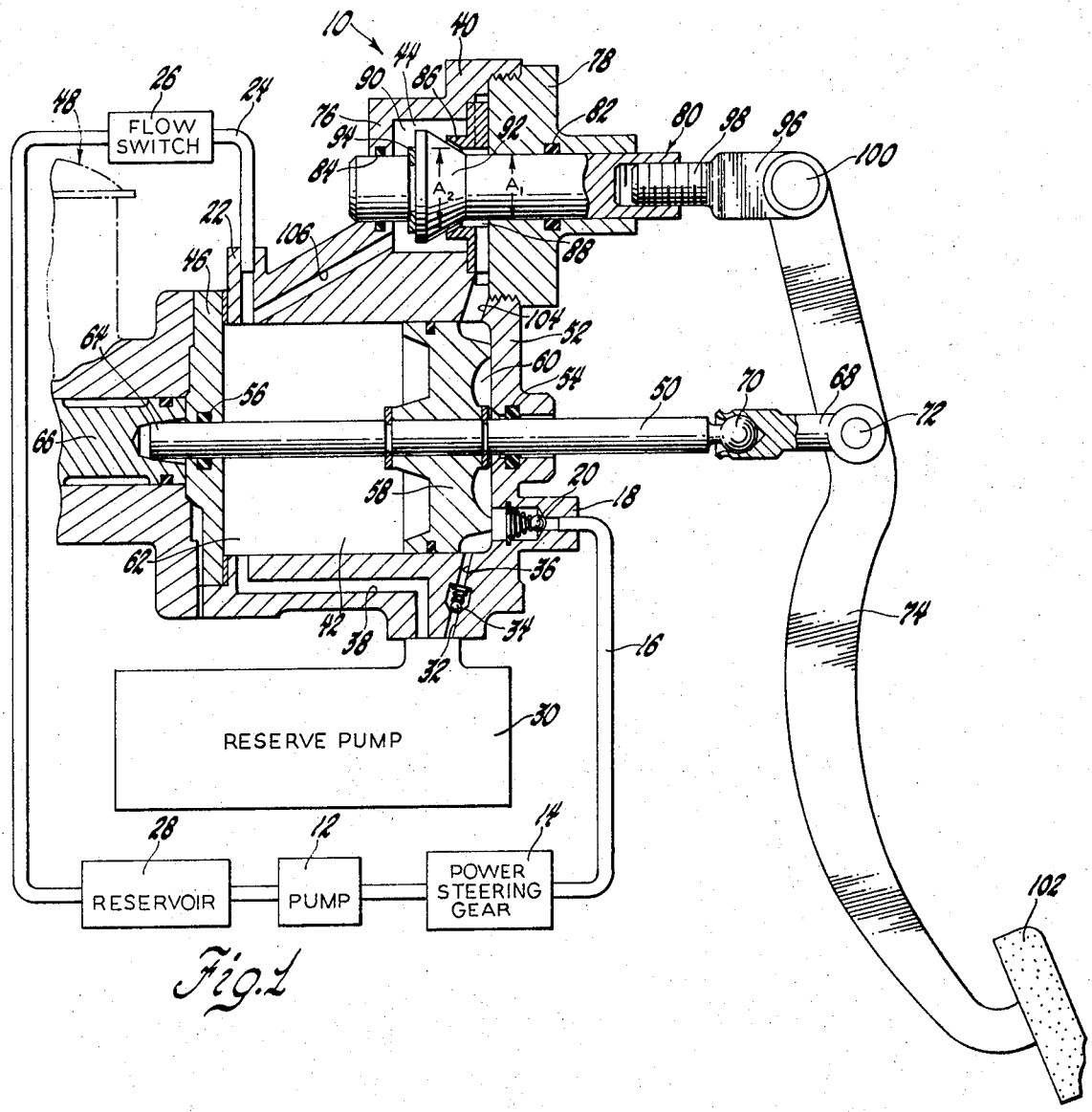
FIG. 1 is a schematic representation, with parts broken away and in section, of a hydraulic brake system with a brake booster therein embodying the invention.

The brake system in FIG. 1 is schematically illustrated as having the booster assembly 10 connected in series with a pump 12 and an open center power steering gear 14. The power steering gear is illustrated as being positioned between the output of pump 12 and the input of booster 10. A suitable pressure conduit or passage 16 is provided for this purpose. However, the power steering gear may be located downstream of the brake booster in some installations. Passage 16 is connected to the booster 10 at inlet 18, a check valve 20 being provided in the inlet to prevent reverse flow. The booster outlet 22 is connected by outlet conduit or passage 24 through a flow sensitive switch 26 to the pump reservoir 28. The booster assembly is provided with a reserve pump 30 which may be electrically powered and controlled under influence of the flow switch 26 to provide sufficient hydraulic pressure to the booster to operate the vehicle brakes when no fluid flow and potential fluid pressure are present at inlet 18. The outlet 32 of pump 30 is connected through a check valve 34 to booster inlet passage 36. The inlet passage 38 for pump 30 is connected so as to receive fluid from the booster in a manner to be described in further detail.

The brake booster assembly 10 includes a housing 40 in which is formed a booster chamber 42 and a control valve chamber 44. These chambers are axially parallel. Booster chamber 42 is covered at its forward end by an end cap 46 to which the master cylinder assembly 48 is secured. A booster rod 50 extends through the rear end wall 52 and the forward end wall formed by end cap 46. Suitable seals 54 and 56 are respectively provided. Rod 50 has the same cross-section area where it passes through the end walls so that it is pressure balanced. The booster piston 58 is secured to rod 50 in chamber 42 so as to separate the chamber into an inlet side 60 located between end wall 52 and piston 58, and an outlet side 62 located between end cap 46 and piston 58. The forward end 64 of rod 50 engages the master cylinder piston 66 so that forward movement of the rod actuates the master cylinder. The rear end of rod 50 extending outwardly of the booster housing 40 has a rod input section 68 connected by suitable means such as ball joint 70 to the portion of the rod associated with the piston 58. The other end of rod input section 68 is connected by pivot 72 to the brake pedal lever 74.

The portion of housing 40 defining valve chamber 44 includes a forward end wall 76 and a removable housing plug 78 forming the rear end wall of chamber 44. End wall 76 and plug 78 have aligned openings reciprocably receiving valve rod 80 therethrough. Suitable seals 82 and 84 engage rod 80 within these openings so as to seal chamber 44. The portions of rod 80 passing through the end wall openings are of equal diameter so that the rod is pressure balanced. An annular valve seat 86 is positioned within chamber 44 and divides that chamber into an inlet side 88 and an outlet side 90. A valve 92 is positioned on rod 80 within chamber 44 and is axially positioned thereon by retainer 94 so that it is aligned for valving cooperation with valve seat 86. The rod 80 has an effective diameter $A_1$ and the valve seat, in its valving relation with valve 92, has an effective diameter $A_2$. The area subtended by the difference between diameters $A_1$ and $A_2$ is the effective area of the valve seat and valve which provides the brake reaction forces transmitted to the vehicle operator. This effective area may be increased or decreased as desired by providing the appropriate size valve seat 86, and for this purpose, plug 78 is easily removable.

The rear end of rod 80 includes a rod input section 96 which is threaded into the rod valve section to provide an adjusting screw arrangement 98. Rod input section 96 is pivotally attached at pivot 100 to the opposite end of brake pedal lever 74 from the pedal 102. The distance between pivots 72 and 100 in relation to the distance between pedal 102 and pivot 72 effectively establishes the mechanical advantage of the brake pedal lever.

Housing 40 has a passage 104 fluidly connecting the booster chamber inlet side 60 with the valve chamber inlet side 88, and a passage 106 fluidly connecting the valve chamber outlet side 90 with the booster chamber outlet side 62. The points of connection of passages 24 and 106 are adjacent but slightly axially spaced from end cap 46. The passage 38 is connected to the booster chamber outlet side 62 at a point axially adjacent end cap 46 so that passage 38 is not closed by any portion of piston 58 at any time. Likewise, passages 16, 36, and 104 are never closed by any portion of piston 58.

In normal vehicle operation the pump 12 is being driven to divide sufficient fluid flow and pressure capability to operate the power steering gear 14 and the brake booster 10 as required. These units are of the open center type and therefore, when they are not energized, the pumped fluid passes through them with a full flow but a nominal pressure which is only sufficient to move the fluid through the entire circuit. The hydraulic fluid enters the booster 10 through passage 16, opening check valve 20 with a very slight hydraulic pressure. The fluid passes through the inlet side 60 of chamber 42 and enters the inlet side 88 of chamber 44 through passage 104. Since valve 92 is positioned well away from valve seat 86, the fluid passes freely between these valve elements and into chamber outlet side 90. Passage 106 then conducts the fluid to the outlet side 62 of chamber 42 and also to the booster outlet 22.

Fluid flow continues through outlet passage or conduit 24 and flow switch 26 and is returned to the pump reservoir 28. The flow in the circuit is sensed by the flow switch 26 which controls the pump 30, preventing that pump from operating under normal conditions.

When the vehicle brakes are to be actuated by the operator, brake pedal 102 is depressed, moving it leftwardly as seen in FIG. 1, causing the lever 74 to pivot about pivot 72 and, therefore, moving valve 92 rightwardly to restrict fluid flow at the valve seat 86. The restriction of fluid flow between the valve members 86 and 92 causes an increase in pressure upstream. Therefore, chamber inlet sides 60 and 88 are pressurized in accordance with this restriction. A pressure differential therefore exists across valve 92 and across booster piston 58. This pressure differential moves the booster piston 58 leftwardly, moving rod 50 to actuate the master cylinder. The vehicle brake hydraulic circuits connected with the master cylinder are, therefore, pressurized and the brakes are actuated. The amount of movement of booster piston 58 is controlled by the amount of pressure differential initiated due to the restriction between valve seat 86 and valve 92. If additional brake apply pressure from the master cylinder is required, pedal 102 is depressed further to increase the restriction effect of valve 92 and increase the pressure differential acting across booster piston 58. The pressure differential acting across the effective area of valve seat 86 on valve 92 tends to move the valve leftwardly in an opening direction, exerting a leftward force on rod 80. This force is transferred through pivot 100 and lever 74 to the brake pedal 102 as a force resisting the pedal depressing action of the operator and results in brake reaction feel being transmitted to him.

If the flow switch 26 should sense a decrease in flow sufficient to indicate that there is not enough hydraulic fluid available to operate the brake booster, the flow switch will energize a circuit which will cause pump 30 to be actuated. This pump will cause fluid within the booster to be circulated through check valve 34 and passage 36, chamber inlet side 60, passage 104, chamber inlet side 88, between valve members 86 and 92, then through outlet chamber 90, passage 106, chamber outlet side 62, and passage 38. Thus, chamber outlet side 62 effectively becomes a reservoir for this circuit. Since check valve 20 will be closed when there is a higher pressure existing in chamber inlet side 60 than in passage 16, no fluid will be transmitted through passage 16 toward the power steering gear mechanism 14. If the brake booster is then actuated by depressing movement of the brake pedal 102, the pressure generated by pump 30 will act across the booster piston 58 and the valve members 86 and 92 as before.

Figure 2:
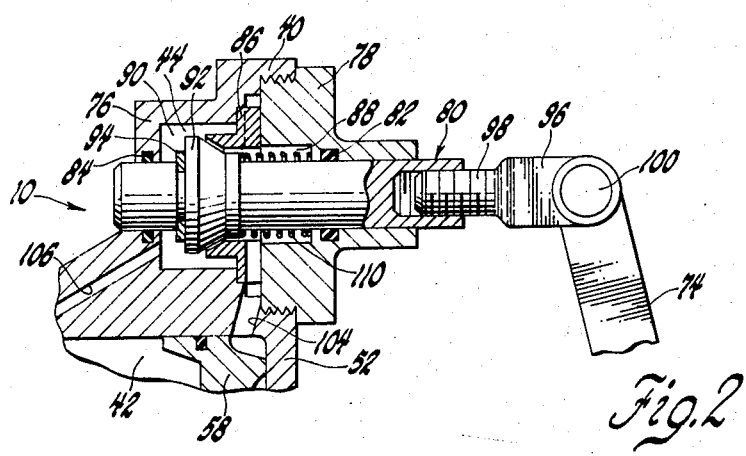
FIG. 2 is a fragmentary view with parts broken away and in section showing a modification of the control valve mechanism used in the booster of FIG. 1.

The valve modification shown in FIG. 2 involves the addition of a preloaded line pressure support spring 110 in the valve chamber inlet side 88 so that the spring urges valve 92 and rod 80 leftwardly toward the valve opening direction. Thus, when the brake pedal is depressed, sufficient force must be applied to overcome the preload of spring 110 before any relative movement is generated between the valve members 86 and 92. This has the effect of providing line support pressure before the brake booster is actuated.

In the booster embodying the invention, the booster assembly supports the brake pedal and, therefore, no pedal hinge or other mounting bracket is required to be connected to the vehicle dash or fire wall. The construction permits a somewhat shorter length booster than is the case when the control valve is provided in axial alignment with the booster piston. The construction permits changing the reaction force ratio by changing the valve seat 86 for one with a different effective area, without disassembling the booster unit. A booster of this construction is compatible with various master cylinder sizes and is arranged to permit immediate manual master cylinder actuation with minimal lost motion. Should there be no booster brake fluid pressure available, the brake apply force must be exerted only through a sufficient distance to cause valve 92 to seat on valve seat 86 and thereby establish pivot 100 in an axially fixed position. Further depression of the brake pedal 102 will cause rod 50 to be moved forward, carrying booster piston 58 with it, and mechanically actuating the master cylinder.

What is claimed is:

1. A power brake booster comprising: a housing having first and second axially parallel chambers formed therein and first and second rods respectively extending through said chambers and axially movable therein, said first chamber having an annular valve seat formed therein receiving said first rod therethrough, a valve on said rod cooperating with said seat to divide said first chamber into an inlet side and an outlet side, said second chamber having a piston reciprocably movable therein and secured to said second rod and dividing said second chamber into an inlet side and an outlet side, first passage means in said housing connecting said chamber inlet sides to each other and to a source of fluid flow and pressure, second passage means in said housing connecting said chamber outlet sides to each other and to a fluid reservoir for said source;

and operator controlled means including a lever pivotally attached only to adjacent ends of said first and second rods and supported by one of said rods, said lever being pivotally movable on said second rod to control the movement of said valve relative to said valve seat to restrict fluid flow through said valve seat and generate a pressure buildup in said chamber inlet sides to move said piston and said second rod to actuate a brake master cylinder, the effective area of said valve seat providing a reaction area on said valve acted on by the pressure differential between the inlet and outlet sides of said first chamber to generate brake feel.

2. A hydraulic pressure actuated brake booster having:

a booster piston chamber divided by a piston into inlet and outlet sides and a valve chamber having a valve seat and a valve member therein dividing said valve chamber into inlet and outlet sides, said chamber inlet sides being in fluid communication and said chamber outlet sides being in fluid communication;

means supplying hydraulic fluid flow and pressure to said chamber inlet sides and receiving hydraulic fluid flow from said chamber outlet sides;

said valve member and said valve seat forming an open center valve permitting unrestricted hydraulic fluid flow therethrough when released and restricting hydraulic fluid flow therethrough to cause a pressure increase in said chamber inlet sides when actuated;

and means including a removable housing plug holding said valve seat in said housing and removable to permit movement and replacement of said valve seat to select a valve seat effective area commensurate with the desired reaction ratio;

the hydraulic fluid pressure differential acting on said valve member over the valve seat effective area, when said valve is moved to restrict flow therethrough, and generating a reaction force proportional to the consequent pressure buildup in said chamber inlet sides, the increase in pressure in said chamber inlet sides being independent of the valve seat effective area and dependent on the flow restriction created by the valve member in relation to the valve seat.

3. A power brake booster comprising: a housing having first and second axially parallel chambers formed therein and first and second rods respectively extending through said chambers and axially movable therein;

said first chamber having an annular valve seat formed therein receiving said first rod therethrough, a valve on said rod cooperating with said seat to divide said first chamber into an inlet side and an outlet side, and spring means yieldably urging said valve away from said valve seat and providing pressure support force;

said second chamber having a piston reciprocably movable therein and secured to said second rod and dividing said second chamber into an inlet side and an outlet side;

first passage means in said housing connecting said chamber inlet sides to each other and to a source of fluid flow and pressure;

second passage means in said housing connecting said chamber outlet sides to each other and to a fluid reservoir for said source;

and operator controlled means including a lever pivotally attached to adjacent ends of said first and second rods to control the movement of said valve relative to said valve seat to restrict fluid flow through said valve seat and generate a pressure buildup in said chamber inlet sides to move said piston and said second rod to actuate a brake master cylinder, the effective area of said valve seat providing a reaction area on said valve acted on by the pressure differential between the inlet and outlet sides of said first chamber as modified by said spring means to generate brake feel, said lever pivoting on said second rod to move said valve and pivoting on said first rod to manually actuate said second rod when the piston is not actuated by pressure during brake applying movement of the lever.

* * * * *